(No Model.) 2 Sheets—Sheet 1.
P. C. LAWLESS.
PIPE COUPLING.
No. 448,966. Patented Mar. 24, 1891.
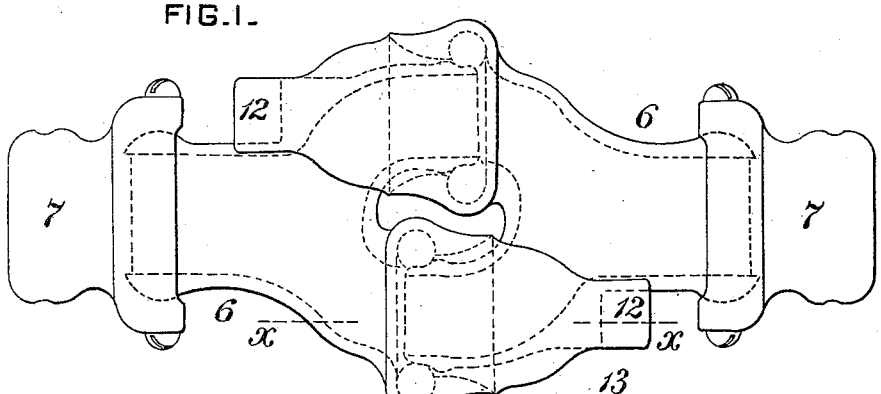
FIG. 1.
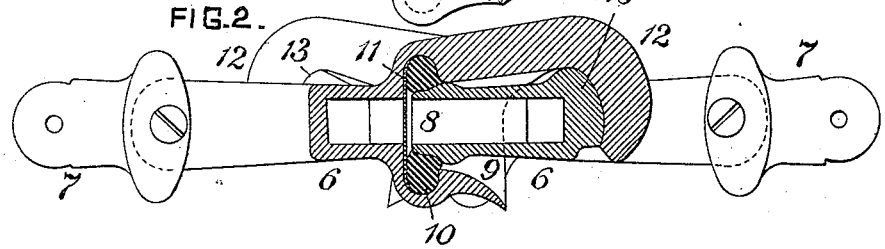
FIG. 2.
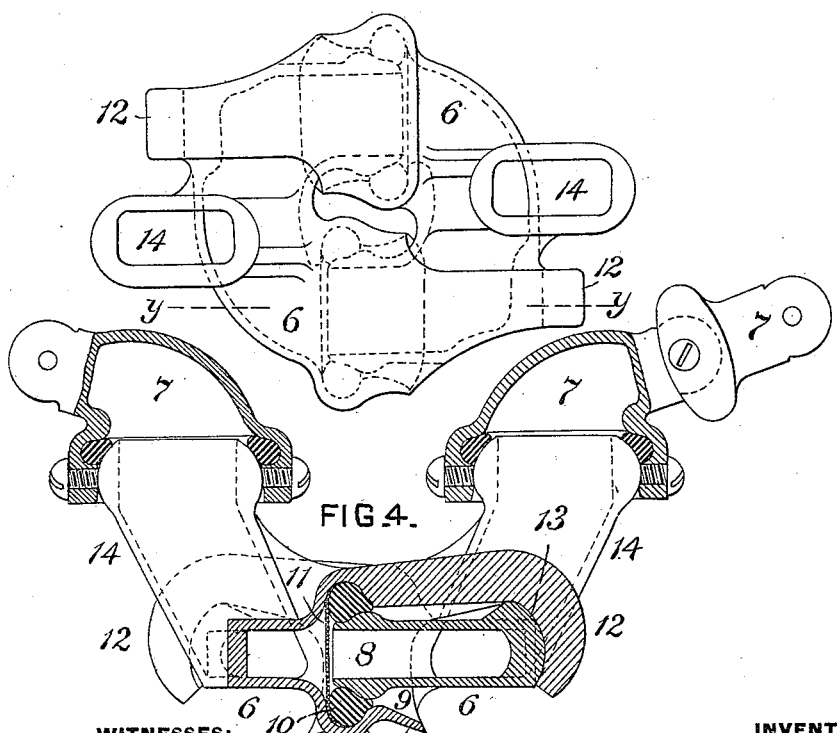
FIG. 3.
FIG. 4.
WITNESSES:
Snowden Bell
F. E. Gaither
INVENTOR,
Philip C. Lawless,
by George H. Christy
Att'y.

(No Model.) 2 Sheets—Sheet 2.
P. C. LAWLESS.
PIPE COUPLING.

No. 448,966. Patented Mar. 24, 1891.

WITNESSES:
J. Snowden Bell.
F. E. Gaither.

INVENTOR,
Philip C. Lawless,
by George H. Christy, Att'y

UNITED STATES PATENT OFFICE.

PHILIP C. LAWLESS, OF WILMERDING, PENNSYLVANIA.

PIPE-COUPLING.

SPECIFICATION forming part of Letters Patent No. 448,966, dated March 24, 1891.

Application filed October 2, 1890. Serial No. 366,858. (No model.) Patented in England February 14, 1888, No. 2,197.

*To all whom it may concern:*

Be it known that I, PHILIP C. LAWLESS, a subject of the Queen of Great Britain and Ireland, temporarily residing at Wilmerding, in the county of Allegheny and State of Pennsylvania, have invented or discovered a certain new and useful Improvement in Pipe-Couplings, (for which I have obtained British Letters Patent No. 2,197, dated February 14, 1888,) of which improvement the following is a specification.

The object of my invention is to provide a simple and efficient coupling for connecting sections of pipe or hose with the capability of detachment whenever desired, and, while designed more particularly for use with flexible piping of the character of that set forth in an application for Letters Patent of the United States filed by me under date of April 9, 1890, Serial No. 347,213, is equally applicable to piping of other descriptions.

To this end my invention, generally stated, consists in a pipe-coupling composed of two sections, each having a bowl or socket end, a nozzle or spigot end, a clamping-hook, and an opposite cam-face, the spigot of each section fitting into the bowl of the other and being held therein by the engagement of the hooks and cam-faces.

The improvement claimed is hereinafter fully set forth.

Figure 5:
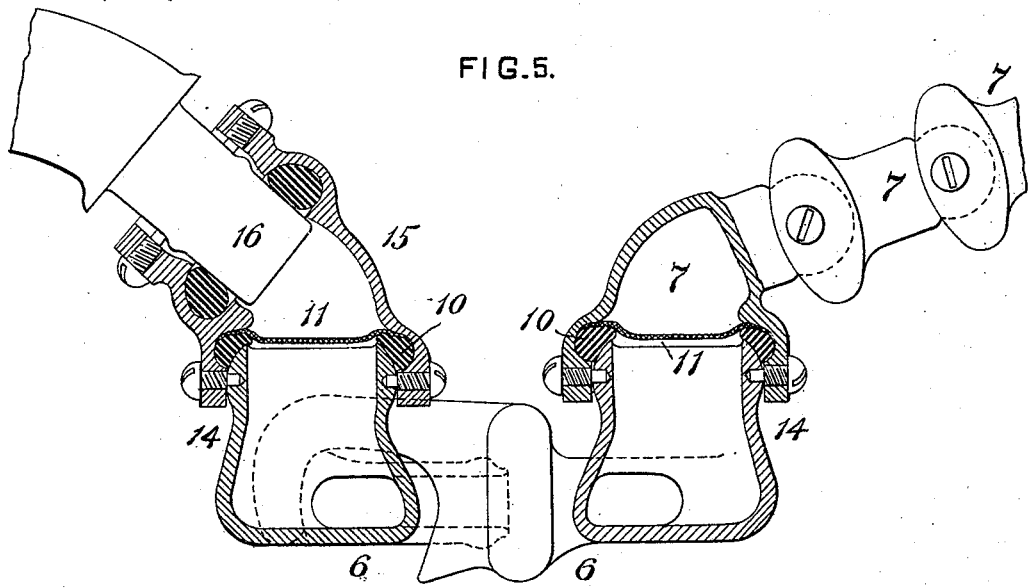

In the accompanying drawings, Figure 1 is a plan or top view of a coupling embodying my invention; Fig. 2, a side view, partly in section, at the line $xx$ of Fig. 1; Fig. 3, a plan view illustraating a modified form of the coupling; Fig. 4, a side view of the same, partly in section, at the line $yy$ of Fig. 3; Fig. 5, a longitudinal central section through a coupling connected to a fixed pipe-nozzle, and Fig. 6 a similar section illustrating the application of the coupling to a flexible hose.

In the practice of my invention I provide two coupling-sections 6 6, of similar form, each of which has an internal passage for the transmission of fluid from one to the other of the lengths or sectons of piping which the coupling serves to connect. The internal passage or fluid-way of each coupling-section diverges from the longitudinal central plane of the section, in which it is located at one end thereof, into two lateral branches, one of which terminates in a nozzle or spigot end 8, having a curved or tapered outer face, and the other in a bowl or socket end 9. When the coupling-sections are brought into proper relation for connection one to the other, the spigot end of each section faces the bowl end of the other and fits therein when the two sections are coupled together, tight joints being insured by packing-rings 10, of rubber or other suitable material. The packing-rings 10 are inserted in recesses in the bowl ends 9 of the coupling-sections and bear against the adjacent faces of the spigot ends 8, a ring or distance-piece of wire-gauze 11 being preferably fitted between the backs of the packing-rings and the recesses in which they are fitted, in order that the pressure of the fluid in the connected pipes and fluidway may be exerted upon the backs of the packing, and thereby act to maintain the tightness of the joint.

In cases where the pressure of the fluid transmitted through the piping and coupling is greater than that of the atmosphere, the wire-gauze rings should be placed on the inner side of the packing-rings, as shown in the drawings; but where the internal pressure is less than that of the atmosphere the distance-pieces 11 should be located adjacent to the outer sides of the packing-rings.

A clamping-hook 12 is formed upon one side of each of the coupling-sections 6 and projects longitudinally therefrom in line with one of its ends—in this instance the bowl end 9. A cam-face 13, which is outwardly curved in substantial correspondence with the inside of the hook, is formed upon the opposite side of each coupling-section, said cam-face being in this instance in line with and in rear of the spigot end 8. Each of the clamping-hooks 12 is adapted to engage with the cam-face 13 of the other coupling-section, and thereby to hold the sections in firm connection when coupled, while admitting of their ready disengagement whenever desired. In coupling the sections 6 6 they are oppositely inclined and moved toward each other, the ends of the hooks 12 being raised sufficiently to clear the tops of the cam-faces 13, and the spigot end of each section is inserted in the bowl end of the other. The sections are then pressed downwardly into a horizontal position or into line one with the other, and the hooks 12 are thereby caused to engage the cam-faces 13, their engagement compressing the packing-rings 10 of the bowl ends, forcing the spigot ends of the sections into close contact therewith and holding the sections firmly together. In addition to preventing leakage at the joints of the sections the packing-rings serve to maintain a proper degree of outward bearing of the cam-faces against the adjacent surfaces of the clamping-hooks, which latter function may, if desired, be similarly performed by helical springs fitting in the bowl and spigot ends and bearing against the walls of the coupling-sections. To uncouple the sections, they are pressed upwardly or inclined in opposite direction to that in which they were moved in coupling them, and the clamping-hooks are thereby disengaged from the cam-faces and the sections separated.

It will be seen that in a coupling of the form of that shown in Figs. 1 and 2 separation of the sections cannot be effected by any strain applied longitudinally or in line with the sections unless sufficiently great to rupture them, while they may be readily uncoupled, when desired, by a comparatively slight manual pressure acting in direction to move them into oppositely-inclined positions. It is, however, desirable under certain conditions of service—as, for example, in fluid-pressure-brake apparatus for railroad-cars—that the coupling-sections should be capable of being separated without rupture or injury by an abnormal strain in the direction of their length, such as results from the parting of two cars of a train to the brake-pipes of which they are nected. Such capacity is provided by upwardly inclining the end portions 14 of the coupling-sections to which the lengths or sections of piping are connected, as shown in Figs. 3 and 4. Under such construction a sufficient degree of longitudinal strain, greater than that normal in service, will move the coupling-sections into inclined positions, as in uncoupling them by hand, and by releasing the clamping-hooks from the cam-faces will effect the separation of the sections without injury thereto or to the connected piping.

Figs. 1 to 4 illustrate the application of my improvement in connecting flexible piping of the construction set forth in my application, Serial No. 347,213 aforesaid, one of the tubular elements 7 of which is jointed to the end portion 14 of each coupling-section. One of the coupling-sections may also, as shown in Fig. 5, be connected to the end or nozzle 16 of a length of fixed pipe through the intermediation of a connecting-piece 15 and accessories, as set forth in said application, the other section being connected to a similar nozzle through the intermediation of a sufficient number of the tubular members 7 to admit of the requisite inclination of the sections in coupling and uncoupling.

Figure 6:
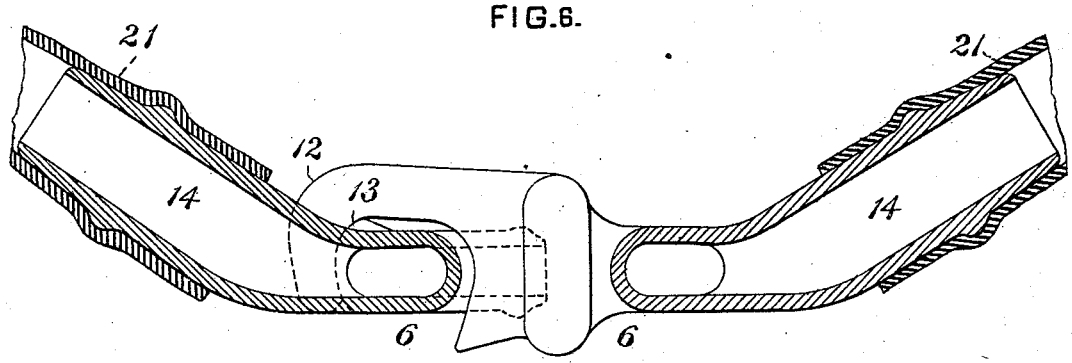

Fig. 6 shows the coupling applied to the connection of two lengths of ordinary flexible hose 21, which are secured upon the outer surfaces of the end portions 14 of the coupling-sections in the usual manner.

I claim as my invention and desire to secure by Letters Patent—

1. In a pipe-coupling, the combination of two attachable and detachable sections, each having a spigot end adapted to fit a bowl end on the other, and a rigid clamping-hook formed integral with each bowl end and adapted to engage a cam-face formed on the back of and in line with the passage through the spigot end of the other section in line longitudinally with the joint of the adjacent bowl and spigot ends, substantially as set forth.

2. In a pipe-coupling, the combination of two attachable and detachable sections, each having a bowl and a spigot end on opposite sides, and a single internal passage or fluid-way extending from the openings of said ends to an opening at the opposite end of the section, and a clamping-hook and cam-face located on opposite sides of the section and respectively in front and in rear of its bowl and spigot ends, the spigot ends fitting into the bowl ends and being adapted to partially rotate therein in the plane of the clamping-hook when the cam-face and hook are being engaged or disengaged, substantially as set forth.

In testimony whereof I have hereunto set my hand.

PHILIP C. LAWLESS.

Witnesses:
J. SNOWDEN BELL,
R. H. WHITTLESEY.